United States Patent [19]
May et al.

[11] 3,914,659
[45] Oct. 21, 1975

[54] SWITCHGEAR TRUCK-MOUNTED POLYPHASE POTENTIAL TRANSFORMER AND SWITCH APPARATUS

[75] Inventors: William E. May, Feasterville; Philip C. Netzel, Milmont Park, both of Pa.

[73] Assignee: I-T-E Imperial Corporation, Spring House, Pa.

[22] Filed: May 9, 1974

[21] Appl. No.: 468,376

Related U.S. Application Data

[63] Continuation-in-part of Ser. No. 443,461, Feb. 19, 1974.

[52] U.S. Cl. ............. 317/103; 200/50 AA; 317/112
[51] Int. Cl.² .......................................... H02B 11/00
[58] Field of Search ....... 200/50 AA, 48 R, 153 SC; 323/44, 48, 49; 317/99, 103, 112, 120

[56] References Cited
UNITED STATES PATENTS

| | | | |
|---|---|---|---|
| 2,237,367 | 4/1941 | Scott, Jr. | 317/103 |
| 3,052,820 | 9/1962 | Kreekon et al. | 317/99 |
| 3,676,749 | 7/1972 | Wilson et al. | 200/50 AA X |
| 3,735,065 | 5/1973 | Brandt, Jr. et al. | 317/103 X |

FOREIGN PATENTS OR APPLICATIONS

| | | | |
|---|---|---|---|
| 1,203,853 | 10/1965 | Germany | 200/50 AA |
| 957,317 | 1/1957 | Germany | 200/50 AA |
| 1,124,089 | 6/1956 | France | 200/50 AA |

*Primary Examiner*—James R. Scott
*Attorney, Agent, or Firm*—Ostrolenk, Faber, Gerb & Soffen

[57] ABSTRACT

A potential transformer is carried on a truck which is racked into and out of a switchgear cubicle to connect and disconnect the potential transformer to a line. Only a single main disconnect of each phase is connected to the line, and the potential transformer output, which can be connected to suitable metering, is taken from conventional secondary contacts on the truck. The rackable truck further carries a fused switch for each of three phases.

5 Claims, 24 Drawing Figures

SWITCHGEAR TRUCK-MOUNTED POLYPHASE POTENTIAL TRANSFORMER AND SWITCH APPARATUS

RELATED APPLICATIONS

This application is related to and is a continuation-in-part of our copending application Ser. no. 443,461, filed Feb. 19, 1974, entitled 38kV LOW CURRENT FUSED SWITCH and assigned to the assignee of the present invention.

BACKGROUND OF THE INVENTION

This invention relates to metal clad switchgear, and more specifically relates to a truck-mounted assembly which can be racked into and out of a connected and disconnected position, respectively, within a switchgear cubicle, wherein the assembly includes a potential transformer for measuring line voltage and currents.

Potential transformers are commonly fixed into high voltage metal clad switchgear compartments to serve to reduce the voltage of the electrical lines being serviced by the switchgear so that the voltage can be safely used for metering, instrumentation and monitoring. Large and well insulated transformers are needed since the voltage of the lines being serviced is high, for example, 38,000 volts. It is difficult to service these transformers since they are heavy, for example, 160 pounds apiece, and it may be hazardous for service personnel to approach the transformers when a line is energized.

BRIEF SUMMARY OF THE INVENTION

In accordance with the invention, potential transformers are truck mounted on trucks which can be racked into and out of a switchgear cubicle. The transformers are then connected to the line at separable disconnect contacts, and the entire truck is easily racked out to safely expose the transformers for maintenance and inspection. A fuse and disconnect switch are provided on the truck for each phase of the line associated with the switchgear and potential transformers are associated with two or three of the phases, as desired. When the potential transformer is used, only the upper disconnect contacts of the truck engage corresponding line terminals, and these terminals are then connected to the potential transformers which can be connected in an open delta or wye-wye configuration. When the assembly on the truck is to be used as a high voltage, low current fused switch, as in above-noted copending application Ser. No. 443,461, a lower disconnect terminal is used for all phases, in place of the input terminal to the potential transformer.

BRIEF DESCRIPTION OF THE DRAWINGS

FIG. 4 corresponds to the schematic illustration shown in FIG. 2.

FIG. 7 is a further enlarged side view of the operating mechanism shown at the bottom of FIG. 5 and in FIG. 6; FIG. 7 is taken on line 7—7 of FIG. 8 looking in the direction of the arrows.

DETAILED DESCRIPTION OF THE DRAWINGS

Figures 22, 24:
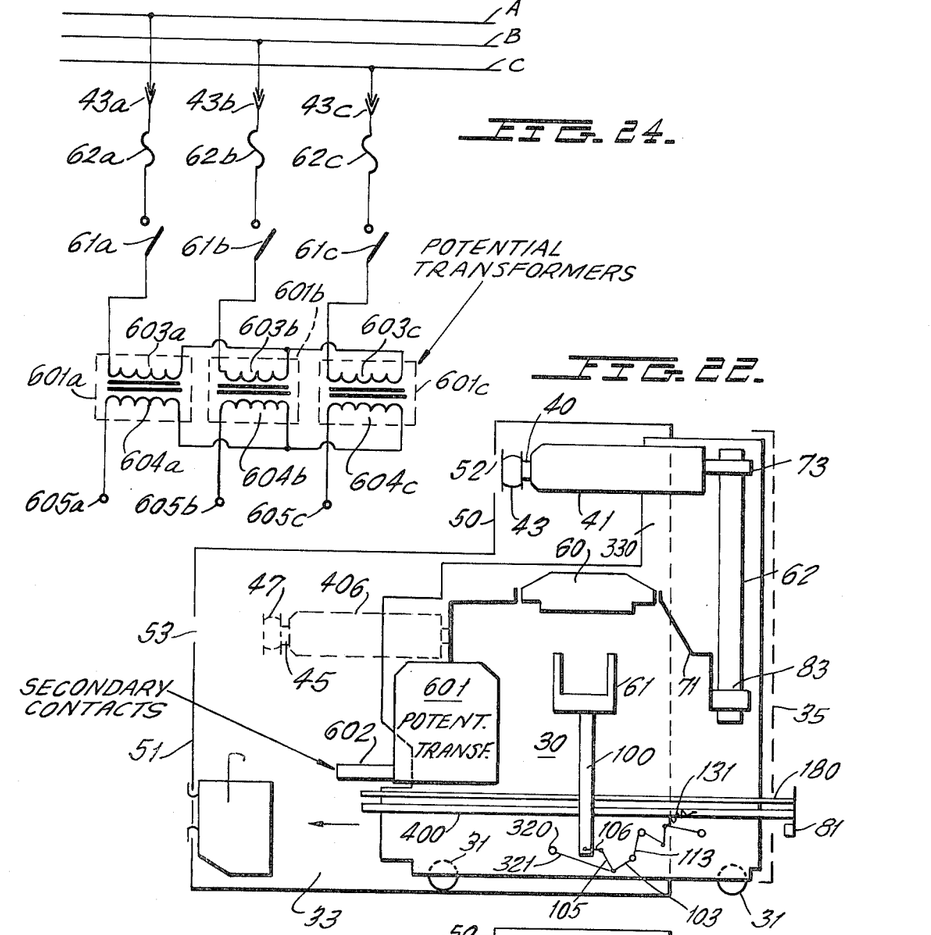
FIG. 22 is a diagram similar to that of FIG. 1, showing the truck assembly modified to have a potential transformer thereon.
FIG. 24 is a circuit diagram of the present invention, showing the potential transformers, one for each phase, connected in a wye-wye configuration.
Figure 23:
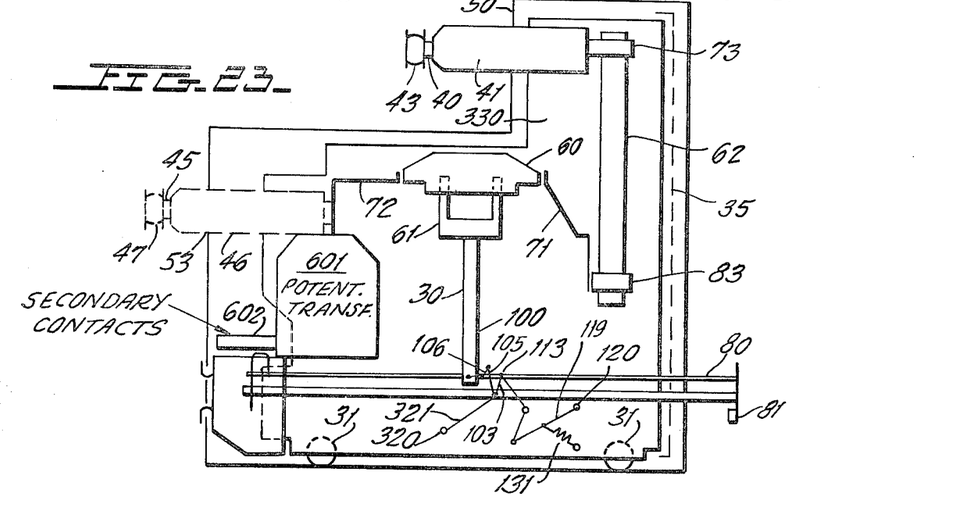
FIG. 23 is similar to FIG. 22 and shows the truck assembly in the connected position, as in FIG. 3.

FIGS. 1 to 21 are shown and described in copending application Ser. no. 443,461. These show the details of the truck assembly and components when arranged to serve as a low current fused draw-out switch for high voltage metal clad switchgear. FIGS. 22 to 24 show the manner in which the device can be used to carry a potential transformer. FIGS. 1 to 21 are first described.

Figure 1:
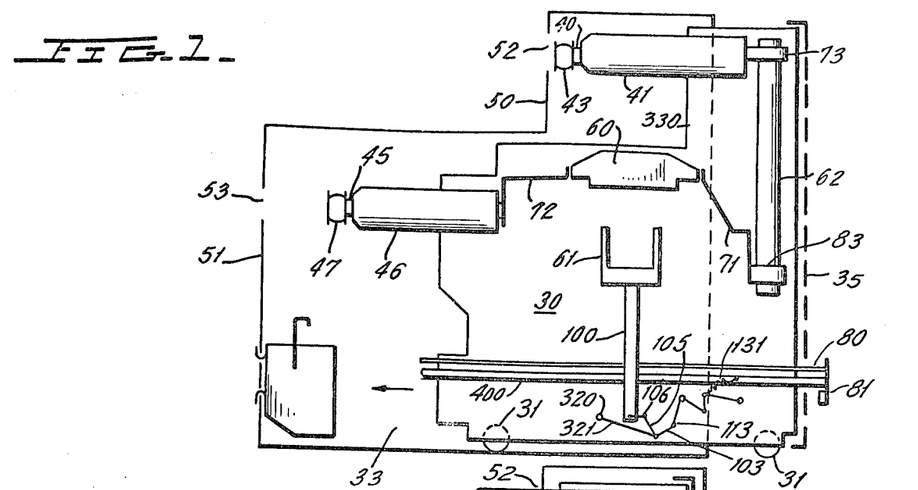
FIG. 1 is a schematic view of the novel switch of the present invention mounted on a truck and partly removed from the switchboard.
Figure 2:
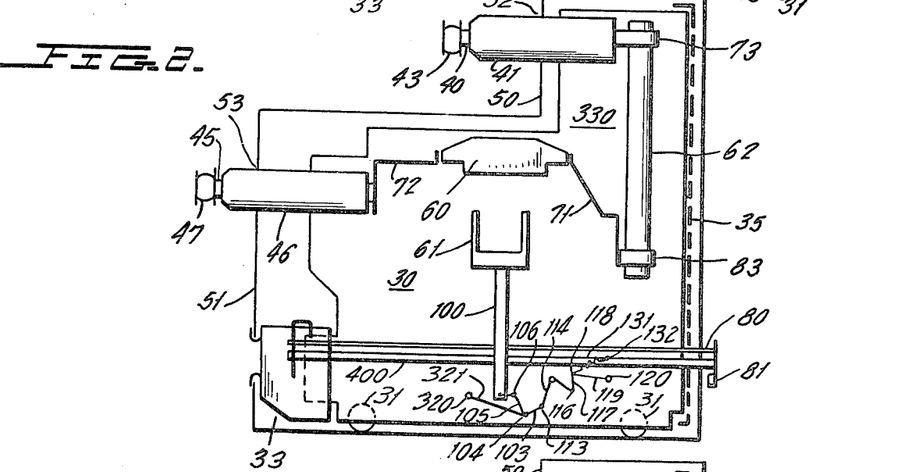
FIG. 2 is a schematic view corresponding to that of FIG. 1 showing the novel switch of the present invention fully racked into the switchboard but with the contacts open.
Figure 3:
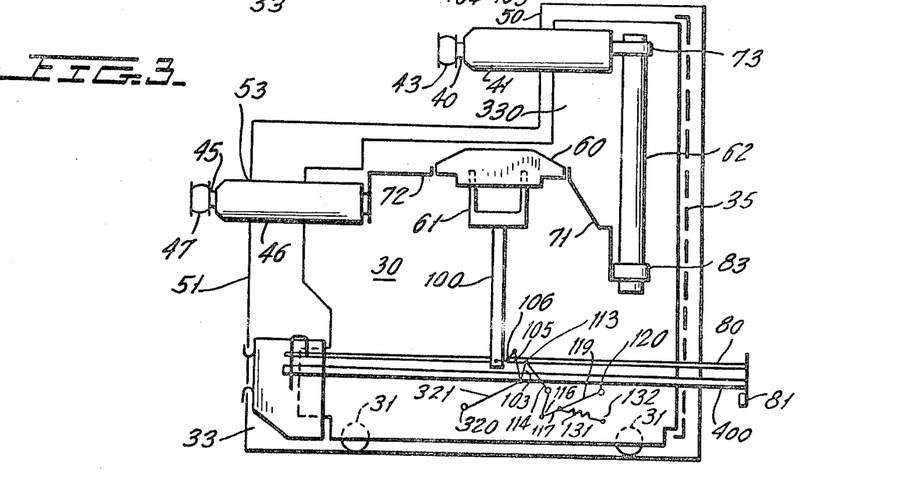
FIG. 3 is a view corresponding to that of FIG. 2 showing the contacts closed.
Figure 4:
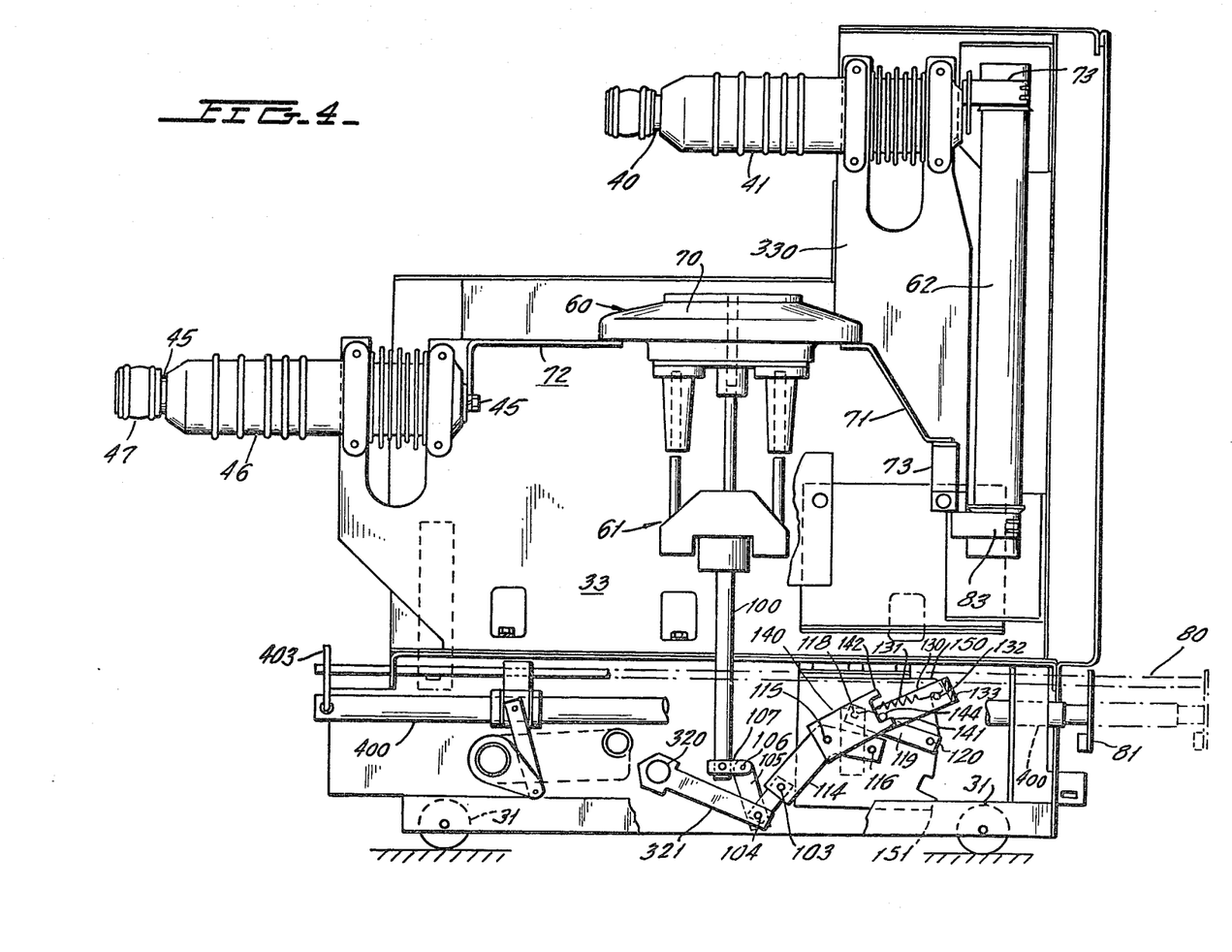
FIG. 4 is a side view of the novel low current high voltage switch of the present invention.

Referring first to FIGS. 1, 2 and 3, the high voltage switch is mounted on a truck 30 having appropriate wheels 31 which enable the entire switch unit to be rolled into the compartment 33 of a switchboard and to be locked therein. The truck 30 therefore carries all of the elements of the switch in a manner hereinafter described including the front panel 35 which may be opened for servicing of the switch after the truck 30 has been moved out of the switchboard compartment 33.

The truck 30 carries the upper back connection stud 40 which in turn is carried in an appropriate insulator 41 on the frame 330 of the switch and which terminates in appropriate back disconnect contacts 43. The trunk also carries the lower back connection stud 45 in its insulator 46, the back connection having the back disconnect contacts 47.

The rear walls 50, 51 of the switchboard have appropriate openings 52, 53 through which the back connection studs 40 and 45 may enter to establish contact with appropriate busses leading, in this case, to the primary winding of the auxiliary power transfomer (not shown). When the switch is fully racked into the switchboard compartment 33 from the position of FIG. 1 to the positions of FIGS. 2 and 3.

The low profile structure is of the type shown in U.S. Pat. No. 3,735,065, assigned to the assignee of the present invention.

The interrupter switch is series connected from the back connection studs 45 through the stationary contact assembly 60 and through the bridging contact assembly 61 to the current limiting fuse 62 and then to the upper back connection stud 40. This enables the interrupting capacity provided in the stationary contact assembly 60 to be coordinated with the interrupting capacity of the current limiting fuse 62. A racking mechanism (hereinafter described more completely in connection with FIGS. 6–16) is provided in order to move the truck 30 and the switch carried thereby to various positions within the housing. The racking mechanism serves as hereinafter described to interlock the switchgear on the truck 30 in the compartment so that the switchgear cannot be withdrawn from the compartment when the contacts are closed and provides also for various positions of the switchgear in the compartment including: a fully racked in position where the back connection studs 40 are connected appropriately to busses behind the compartment, a partially racked out position where the back connection studs are disconnected from their source of power but the moving bridging contact 61 may be operated for test purposes and an unlocked position where the switchgear may be completely racked out of the compartment provided the bridging contacts 61 are in the open circuit position.

The operating rod 100 for the bridging contact 61 is more specifically described in connection with FIGS. 4 to 7 but essentially consists of a spring driven closing member; an operator is provided to drive the spring from one overcenter position in which the contacts 61 are in one condition (open or closed) to another overcenter condition in which the contacts 61 are in the other position (closed or open). As seen in FIGS. 1 to 5 the stationary contact structure 60 comprises an insulating structure 70 supported between the conductors 71 and 72, conductor 71 being secured to the lower contact structure 83 for the fuse 62. Conductor 72 is secured at its opposite end to the lower back connection stud 45.

Figure 13:
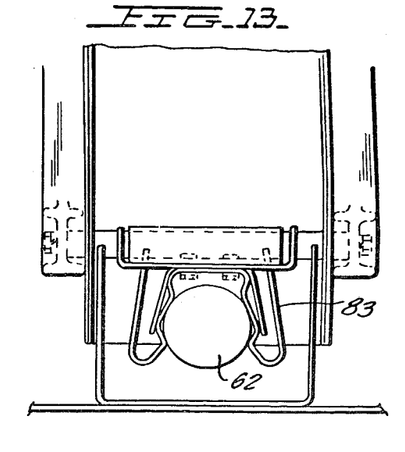
FIG. 13 is a view of the lower fuse contact taken from line 14—14 of FIG. 12.
Figure 14:
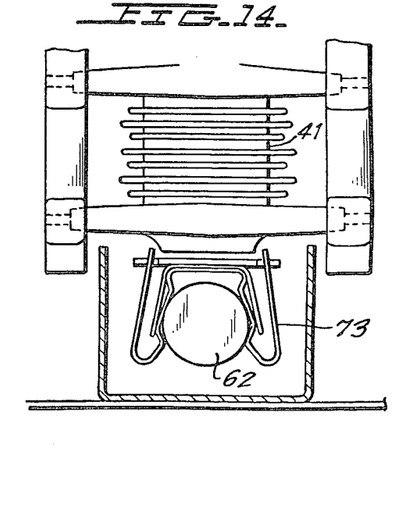
FIG. 14 is a view of the upper fuse contact taken from line 13—13 of FIG. 12.
Figure 15:
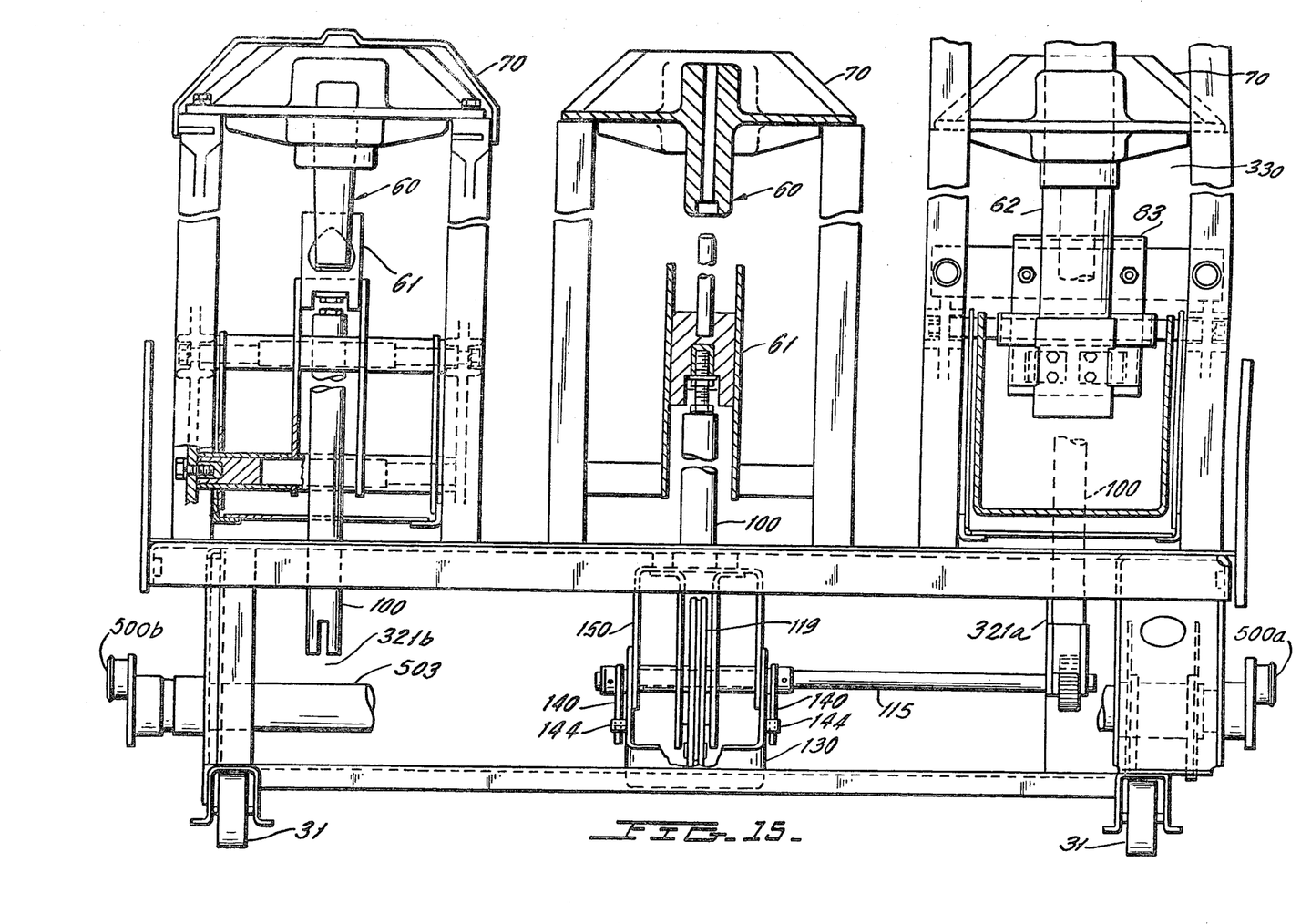
FIG. 15 is a view corresponding to FIG. 12 showing the entire three pole switch.

The upper end of the fuse 62 is connected to the upper contact structure 73 (FIG. 4) for the fuse which in turn is connected to the upper back connection stud 41. It will thus be seen that in the event the fuse is utilized to interrupt the current, the fuse 62 may readily be removed from the contacts 73 and 83 and another fuse replaced. The fuse contacts are also seen in FIGS. 13 and 14 in detail and in FIG. 12. This type of contact structure for a fuse is well known and requires no further description here. Also the concept of coordination a fuse with an interrupter is well known and requires no further description at this point.

The operating mechanism for the switch is essentially similar to that shown in application Ser. No. 396757 filed Sept. 13, 1973, now U.S. Pat. No. 3,830,994 and assigned to the assignee of the present invention. It may also be of the type shown in application Ser. No. 406,473 filed Oct. 15, 1973, now U.S. Pat. No. 3,872,273 assigned to the assignee of the present invention. This operating mechanism is shown specifically in FIGS. 4, 5 and 6 in its fully operative form and in FIGS. 1, 2 and 3 in schematic form.

The preferred method of operating the push rod or operating rod 100 of the bridging contact 61 is through an overcenter spring arrangement which in effect will provide a charged spring for operation in either direction and thereby insure a smooth continuous and rapid operation so that any arc which may be drawn will not hang in an intermediate position of the contacts but will be rapidly extinguished by the continuity of movement from the position of FIG. 1 to the position of FIG. 2.

The operating means for the push rod 100 comprises a bell crank 114 which is loosely mounted on the shaft 115. Pin 113 of bell crank 114 is connected to the link 103 which in turn is connected by pin 104 to link 105. The opposite end of link 105 is connected by pin 106 to an extension 107 of the push rod 100. Thus as the bell crank 114 is rotated about the shaft 115 the direction of rotation of the bell crank 114 will either act to push the bridge contacts from the solid line position of FIG. 5 to the dotted line position or in the opposite direction to pull the push rod 100 up back to the solid line position. The pin 116 is connected to toggle link 117 which through the toggle pin 118 is connected to toggle link 119, the opposite end of which is connected and rotatably mounted on the pin 120. A tension spring 131 is connected between the pin 132 at the outer end 133 of the spring carrying member 130 and the toggle pin 118 of the toggle 116-119. When the spring carrying link 130 is moved from the position shown in FIGS. 3 and 5 to the position shown in FIGS. 1 and 2 and through the various positions shown in FIG. 7 the spring 131 serves as it passes from one side of the toggle link 119 to the other side of the toggle link 119 to draw the toggle 117-119 toward a collapsed position in the direction of tension of the spring.

The collapse of the toggle from the position shown in FIG. 3 thereby pulls on the pin 116 driving the bell crank lever 114 counterclockwise and driving the push rod 100 carrying the bridge assembly 61 in the opening direction. When the spring carrying link 130 is moved from the position of FIGS. 1 and 2 back to the position of FIGS. 3, 4 and 5 when as the spring 131 passes through the point of alignment with the toggle link 119 to the underside of the toggle it draws the toggle 117-119 from the position of FIGS. 1 and 2 back to the position of FIGS. 3 and 5 thereby resulting in closing of the switch.

The means for moving the tension spring carrier 130 from the position of FIGS. 1 and 2 to the position of FIGS. 3, 4 and 5 and back again includes the crank 140 which has the extensions 141 and 142. The spring carrier 130 is provided with a bearing pin 144 which is engageable by either of the extensions 141 or 142 on the crank 140.

Crank 140 is keyed to the shaft 115. When the shaft 115 is rotated in one direction then the extension 142 will raise the pin 144 to operate the spring carrier 130 so that the spring 131 moves to the opposite side of the toggle center and collapses the toggle toward an opening direction for the switch.

On a reverse movement of the shaft 115 the extension 141 now engages the pin 144 and results in a closing operation of the switch. Extensions 150 and 151 on guide plate 152 are provided to bear against the sideward extension of pin 132 to limit the movement of the spring carrier 130 in either direction.

Figure 8:
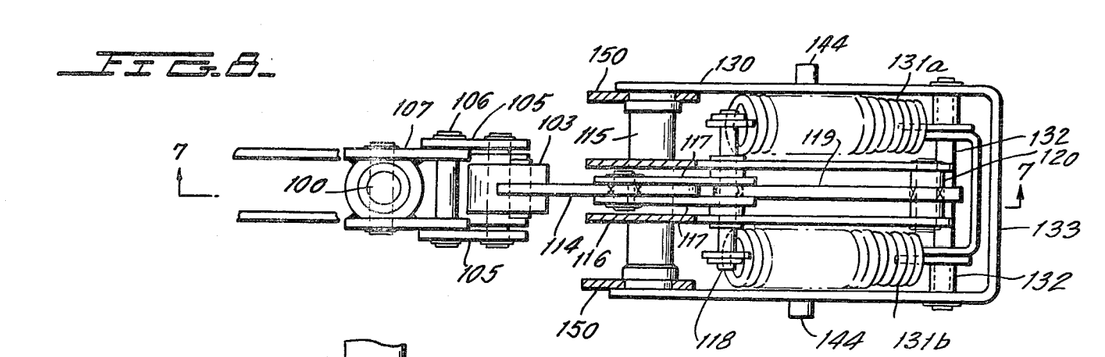
FIG. 8 is a top view of the operating mechanism of FIG. 6.

FIG. 8 shows the actual construction of the link arrangement in which the tension springs 131 actually comprise a pair of tension springs 131a and 131b on the pins 132 in the carrier 130, the carrier having the operating pins 144 and the carrier 130 also being freely rotatably mounted on the shaft 115. The toggle 117–119 may also readily be seen as well as the bell crank lever 114 which also is loosely mounted on the shaft 115. The operating crank 140 and its upper extension 141 may readily be seen including its cooperation with the pin 132 as well as the link connection through line 105 to extension 107 and pin 106 of the contact operating shaft.

Figure 5:
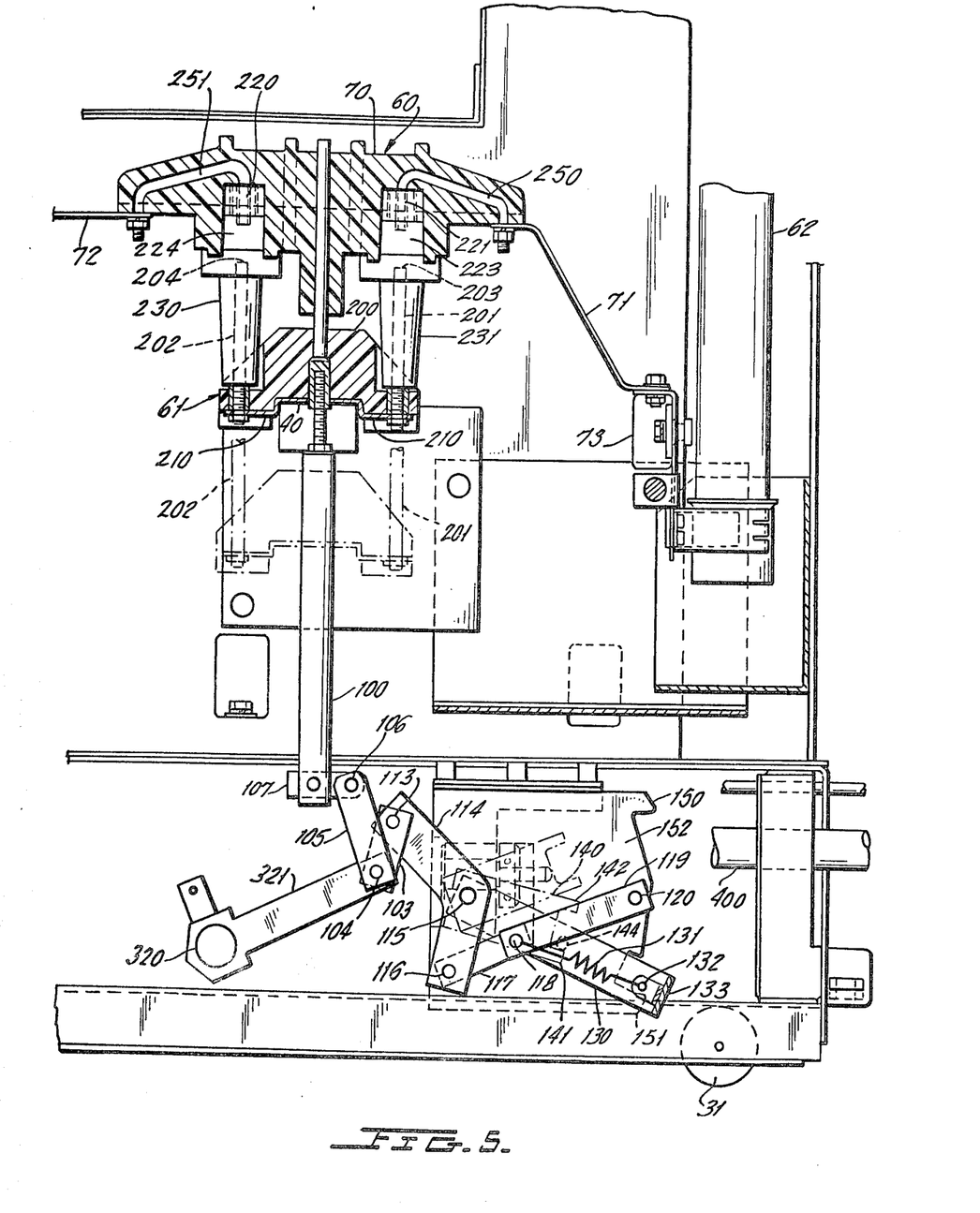
FIG. 5 is an enlarged view of a portion of the novel switch of the present invention showing the contacts closed.
Figure 12:
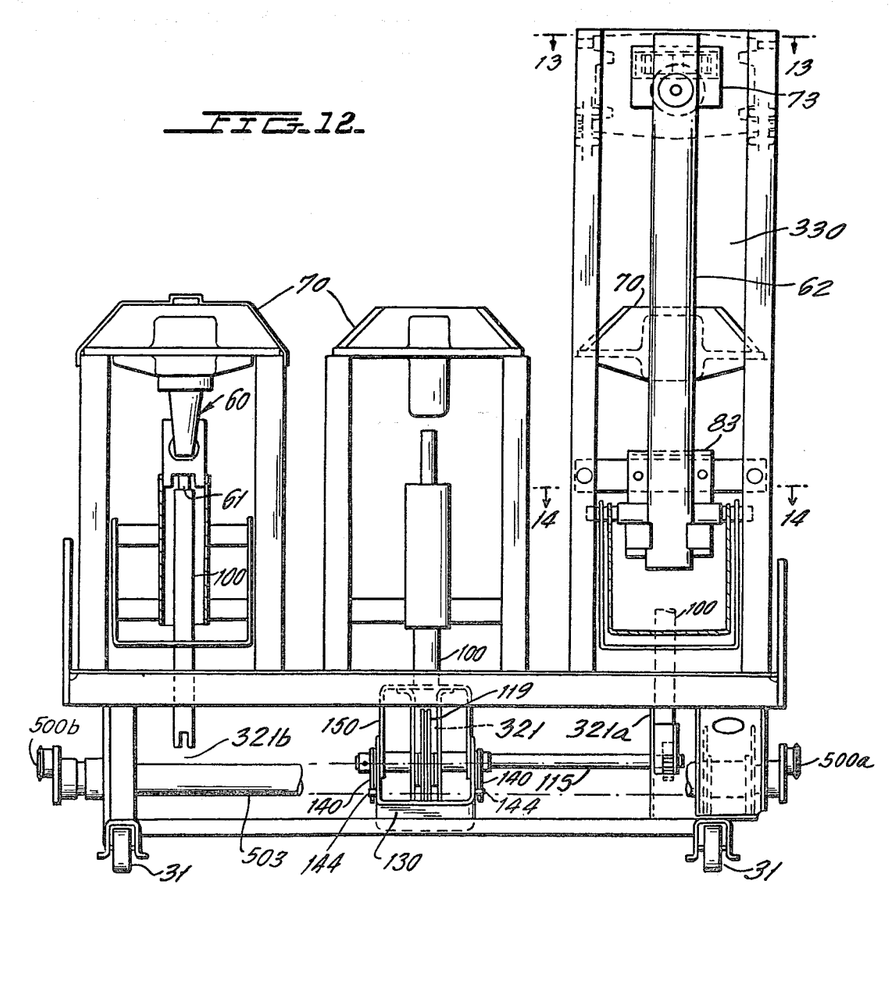
FIG. 12 is a front view of the switch showing the fuse mounting and operating elements.

The contact structures may be understood more readily from FIGS. 5 and 12 in which the bridging contact 61 comprises an insulating carrier 200 mounted on the operating shaft 100 and provided with vertically aligned bridging contact members 201, 202 which have appropriate contact tips 203, 204 of material which will resist an arcing condition.

In essence then the bridging contact elements 201, 202 are probe members connected electrically to a conductive cross strap 210 by which they are bridged together.

The stationary contact support 60, as previously pointed out, is basically of an epoxy material as is the bridging member support 61. Appropriate stationary contacts 220, 221 are located in the recesses 223, 224 of the insulating support 60 for the stationary contact. These stationary contacts 220, 221 are engaged by the ends of the contact probes 201, 202 of the bridging contact structure 61 when the structure is moved to the solid line closed circuit position of FIG. 5 and are disengaged when the structure is moved to the dotted line position of FIG. 5 or the position shown schematically in FIGS. 1 and 2.

The housing 60 for the stationary contact structure in addition to the recesses 223, 224 is provided with bushings 230, 231 which serve to encase the moving contact elements 201, 202 when they are fully inserted in bridging relation with the contacts 220 and 221. These bushings are also of an epoxy or other insulating material similar to that utilized for the housing 60 of the bridging contacts and serve as an arc extinguishing chute for attenuating, confining and extinguishing the arc as the arc is drawn down the tube when the moving contacts 201, 202 are moved from the solid line to the dotted line position of FIG. 5 or from the position of FIG. 3 to the position of FIGS. 1 and 2.

The conductor strap 71 leading to the lower contact structure 73 of the fuse 62 is connected to the conductor 250 which in turn is connected to stationary contact 221. Similarly the conductor strap 72 for the upper back connection stud 40 is connected to the conductor 251 which in turn is connected to the stationary contact 220.

By this means therefore a simplified method is provided for operating a low current switch from a closed to an open position and extinguishing the low current arc.

It should also be noted that the profile of the switch is arranged to accommodate itself to the relatively low volume small size high voltage switchboard of the type already described in U.S. Pat. No. 3,735,065 assigned to the assignee of the present invention.

Figure 16:
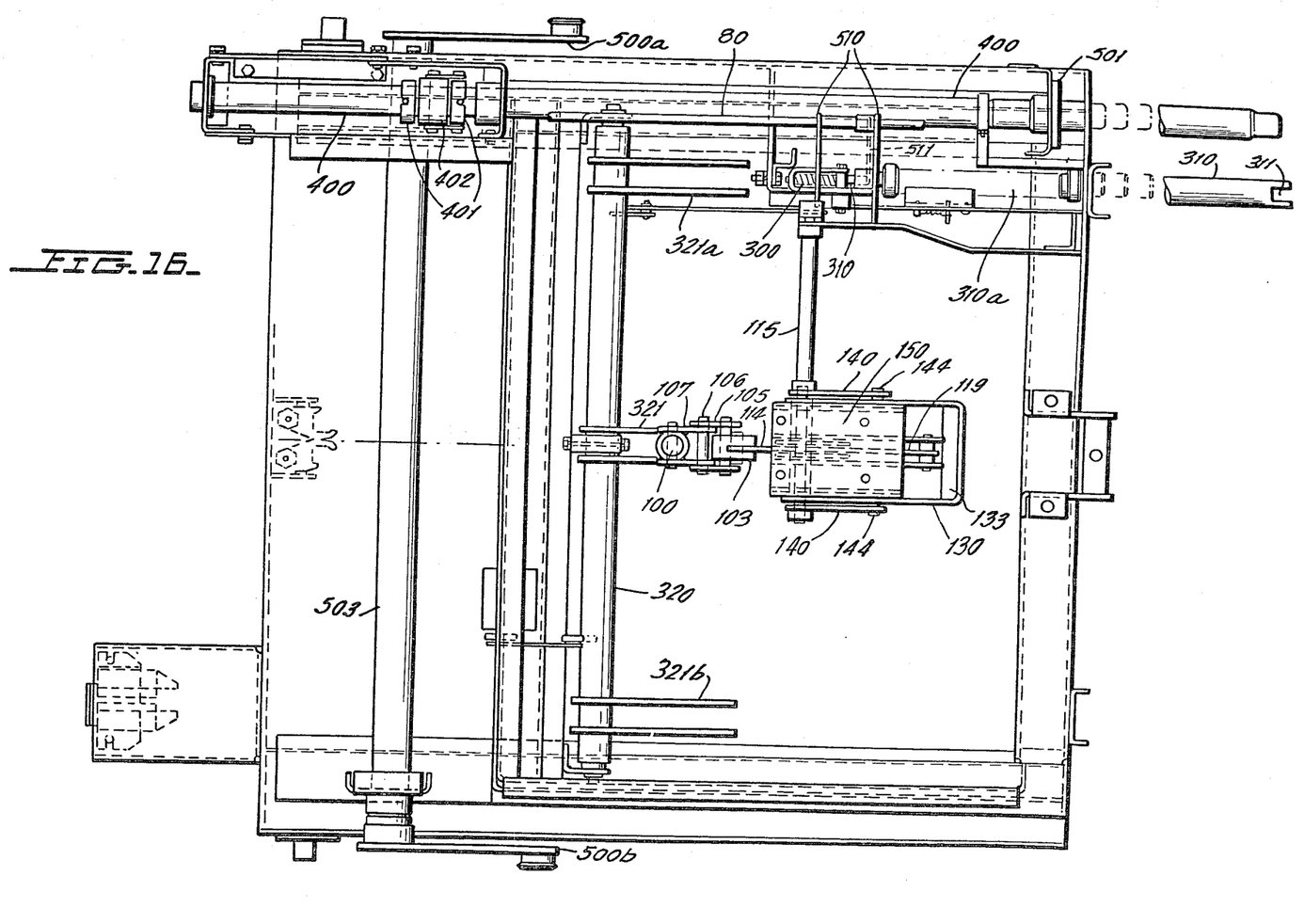
FIG. 16 is a bottom plan view of the switch showing the racking and switch operating arrangement.
Figure 17:
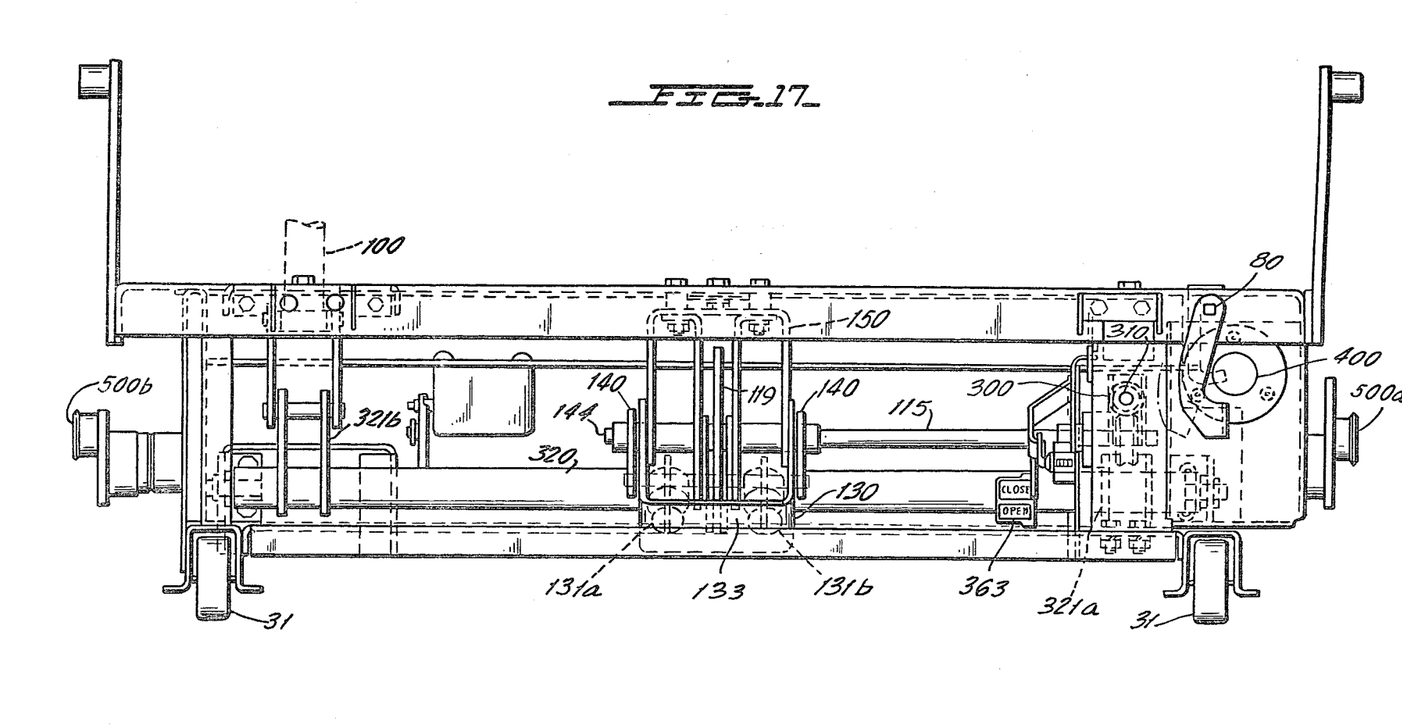
FIG. 17 is a detailed front view of the operating and racking elements of the switch.
Figure 18:
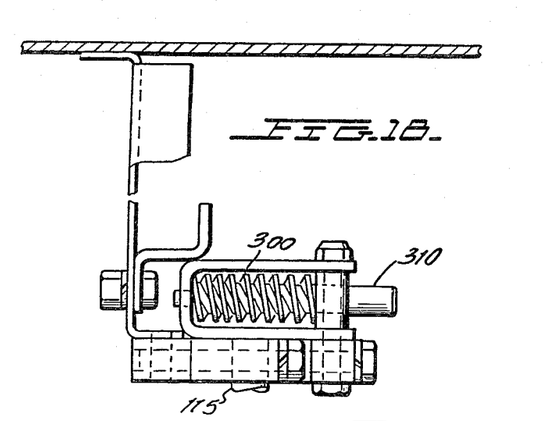
FIGS. 18 and 20 are views of the operating elements of the switch and the connections to the main operating shaft.
Figure 19:
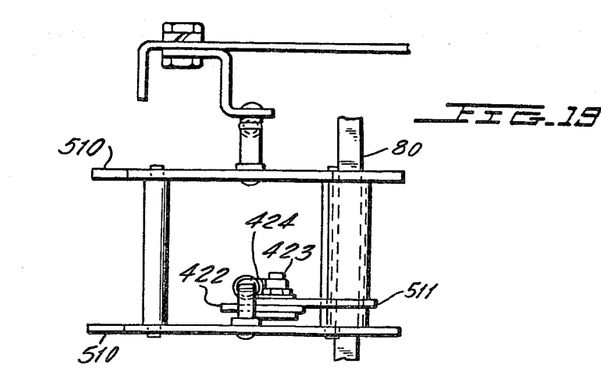
FIGS. 19 and 21 are views of the racking mechanism interlock.
Figure 20:
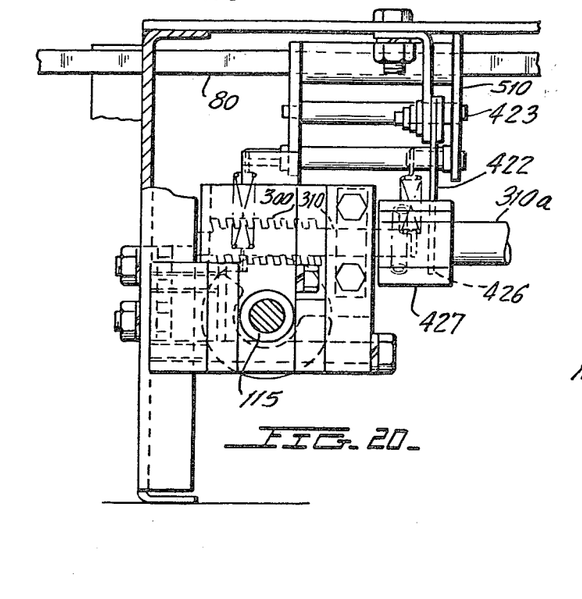
Figure 21:
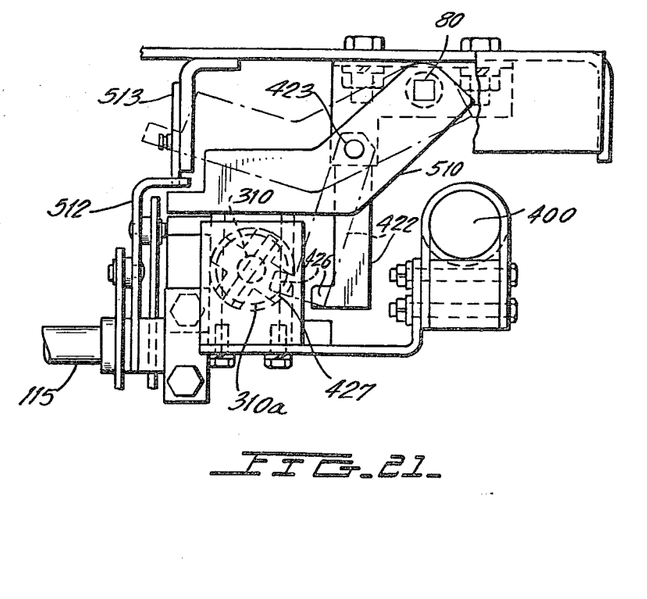

The method of operating this switch operating shaft 115 is shown in FIGS. 16, 17, and 18 to 21. The switch operating shaft 115 is connected by the worm gear arrangement 300 FIGS. 18 and 20 to the principal operating shaft 310 in the truck (See also FIGS. 16 and 17). The rotation of the shaft 310 by a handle which may be connected and disconnected from the free end 311 thereof will, through the worm gear arrangement 300 shown in detail in FIGS. 18 and 20, operate the switch shaft 115 to move the switch between the open and closed positions of FIGS. 2 and 3. The switch is also provided with a jack shaft 320 which will operate the three pole arrangement of the type shown in FIGS. 12 and 13. The jack shaft 320 is provided with a crank 321 which is connected to the pin 104 of the operating mechanism of FIG. 5 and the crank 321 and the jack shaft 320 are accordingly operated downwardly or clockwise when the switch is open and upwardly or counterclockwise when the switch is closed. Jack shaft 320 is provided with similar cranks 321a and 321b keyed to the jack shaft 320 at each of the three pole switch locations so that as seen in FIGS. 12 and 17 the operating mechanism for the center of the three pole switch may be utilized to operate the whole set of switches.

Also in FIGS. 12, 13 and 14 the fuse arrangement is shown whereby the fuse 62 is engaged by the upper contact arrangement 73 and by the lower contact arrangement 83 and the structure 330 which supports the fuse contacts is shown for one of the poles of the three poled switch but is obviously usable for each of the other poles as well so that each of the switches may be coordinated with its individual fuse.

The switch operating shaft 310 is a telescoping shaft which may slide into the shaft 310a, being appropriately shaped to operate the same so that the switch operating shaft will be available for actuation of the mechanism regardless of the position of the mechanism with respect to the truck on which it is mounted.

Figures 6, 9, 10, 11:
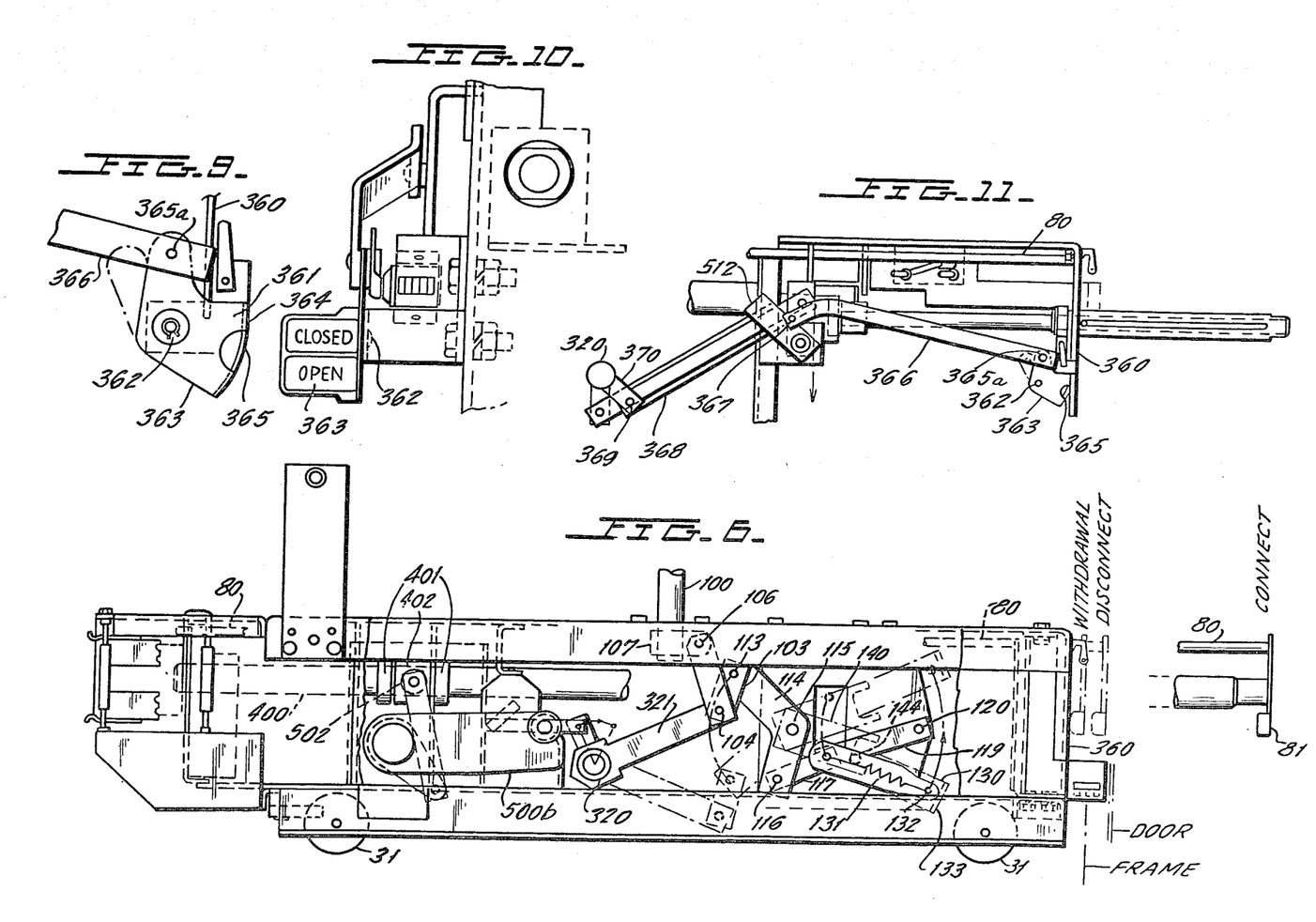
FIG. 6 is an enlarged schematic view showing the operating mechanism for the switch in conjunction with the racking mechanism.
FIGS. 9, 10 and 11 are detailed views of the racking interlock mechanism.
Figure 7:
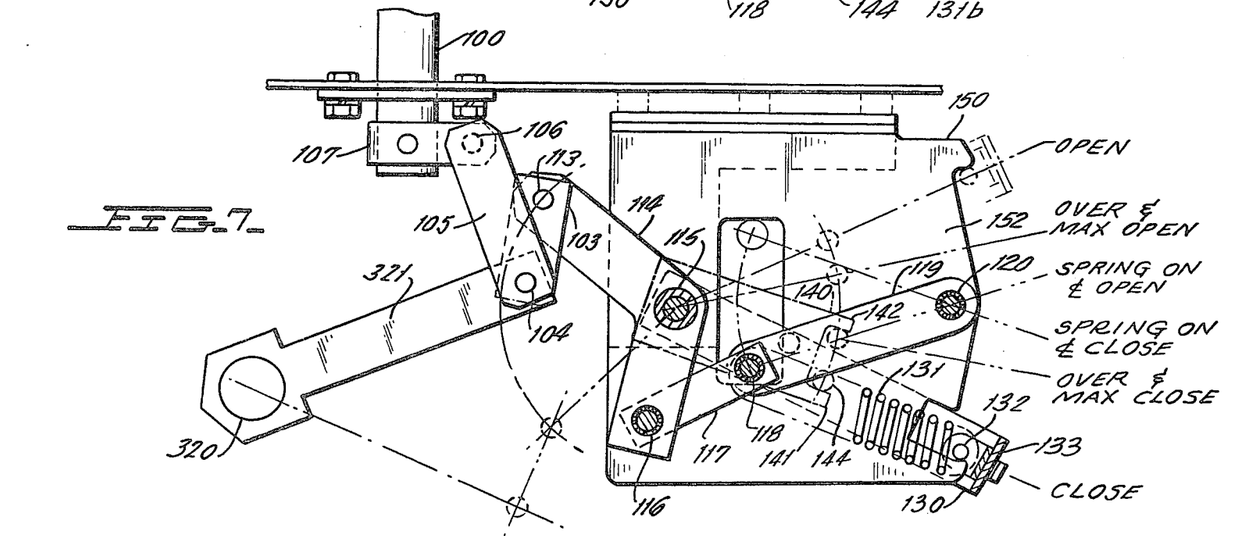

The front side frame 360 of the switch housing on the truck FIGS. 9, 10, 11 carries a bracket 361 on which is mounted the small shaft 362. Bell crank lever 363 is pivotally mounted on the shaft. One end of the bell crank lever carries indicia tabs 364 to show the closed or open position of the switch. These tabs are visible through a window 365 (FIG. 9) in the front side frame 360 of the switch. The opposite end of bell crank lever 363 is connected by pin 365a to the drive lever 366 which in turn is connected by the pin 367 to the link 368 connected by pin 369 to a crank 370 on the jack shaft 320. The rotation of the jack shaft 320 will thereby operate the bell crank lever 363 to present the closed or open indicia to view through the window thereby signalling the condition of the switch.

The racking mechanism for inserting the truck into the compartment and for moving the truck in the compartment is shown in FIGS. 6 and 16. Crank arms 500a and 500b carry rollers which engage in fixed cam plates in the compartment. The racking shaft 400 has an external thread which engages with a nut 501 fixed to a bracket at the front of the truck. Clockwise rotation of the shaft 400 will cause the shaft to advance out of the front of the truck. A clevis 402 is slidably mounted on the shaft 400. This clevis 402 is positioned between two collars 401 which are pinned to the shaft 400 and rotate with it. As the shaft is moved by its reaction with the nut 501, the clevis 402 is moved with it. Links 502 are connected between fixed pins extending outward from the sides of the clevis 402 to a crank on the cross shaft 503. Movement of the clevis 402 along shaft 400 causes shaft 503 to be rotated by the action of the aforementioned links 502 and the cross shaft crank. Crank arms 500*a* and 500*b* are fixed to the ends of cross shaft 503 and are also rotated by the action of the 502 links and crank. As the crank arms 500*a* and 500*b* are rotated, they engage with a slotted cam surface in the fixed cam plates in the compartment. Clockwise rotation of the racking shaft 400 causes the breaker to advance into the compartment and counter clockwise rotation of shaft 400 will cause the breaker to move out of the compartment. The shaft 400 is provided with two blind holes which are engaged by stop link 403 fixed to the square interlock shaft 80 to provide for stopping the racking mechanism in the connect and disconnect positions in the compartment.

When the breaker reaches one of the stopped positions, the stop link 403 on the square interlock shaft 80 automatically engages with the hole in the racking shaft 400 and prevents further rotation of the racking shaft. The racking mechanism can only be released from a stopped position by rotation of the interlock shaft 80 by the lever 81 at the front of the breaker.

The racking mechanism and the switch operating mechanism are interlocked so that
1. the switch cannot be moved from a stopped position (connect or disconnect) unless the switch contacts are open.
2. the switch cannot be closed unless the racking mechanism is in a stopped position.
3. the racking mechanism can be padlocked in either the connect or disconnect position. This padlocking prevents moving of the switch from the stopped position but does not interfere with the operation of the switch mechanism.

Interlocking between the racking mechanism and the switch operating mechanism is accomplished in the following manner.

If the racking mechanism has been operated to move the switch truck to one of the stopped positions, the switch operating mechanism can then be operated to close the switch contacts. On the closing of the switch contacts, the jack shaft 320 is rotated in a counter clockwise direction. This causes link 368 to drive the interference link 512 in a clockwise sense. An extension on link 512 is thus positioned above the end of link 510 prohibiting the rotation of link 510. The racking mechanism interlock shaft 80 is thus prevented from rotating and the racking shaft 400 cannot be rotated since it is held by the stop link 403.

When the switch operating mechanism is operated to open the switch contacts, the jack shaft 320 is rotated clockwise and through link 368 rotates interference link 512 counter clockwise and permits rotation of the square interlock shaft 80 by handle 81. This action retracts the stop link 403 from the hole in the racking shaft 400 and permits movement of the switch truck by the racking mechanism.

Rotation of the indexing shaft 80 by the handle lever 81 in a clockwise direction sets up the interlock to prevent operation of the switch mechanism when the switch truck is in an intermediate position between the fixed stopped positons. When the square indexing shaft 80 is rotated clockwise, spring 424 applies tension to latch link 422. This causes the end of the latch link 426 to engage with a notch 427 in the operating shaft 310*a*. The shaft 310*a* is thus prevented from rotation and this prevents operation of the switch contacts while the racking operation is being carried out. The lever 510 cannot return to its counter clockwise position until a stopped position of the racking mechanism is reached. Shaft 80 is prevented from rotating counter clockwise by the action of the stop link 403 on the surface of shaft 400 between the indexing holes.

Padlocking of the racking mechanism can be accomplished when the switch truck is in one of the indexed positions in the compartment. Link 513 is moved toward the front of the switch. This causes an interference with the lever 510 and prevents racking of the switch by preventing release of the stop link 403 from the indexing hole in shaft 400. When the link 513 is drawn forward a slotted hole is exposed. A padlock can then be inserted.

THE TRUCK-MOUNTED POTENTIAL TRANSFORMER

Referring to FIGS. 22 and 23, there is shown the truck assembly of FIGS. 1 and 3 respectively, and shows the manner in which potential transformers are mounted on the truck. FIG. 24 shows one circuit configuration which can be used for the potential transformers. Referring first to FIGS. 22 and 23, the lower insulators 46 are removed from each phase on the truck, and their prior positions are shown in dotted lines. A potential transformer 601 is then added to the phase shown, and is mounted as by bolting to the truck body 30. One input terminal of potential transformer 601 (to its primary winding) is connected to conductor 72. The second terminal of the transformer primary winding and its secondary winding terminals are then connected to conventional truck secondary contact terminals 602 which slidably engage stationary secondary terminals fixed to the switchboard in the conventional manner. This allows interconnection between the potential transformers of each phase and the connection of the potential transformer secondary or low voltage winding to appropriate metering and control equipment.

FIG. 24 shows a circuit diagram of the potential transformer arrangement and the high voltage line to which the transformers are connected in FIGS. 22 and 23. Thus, in FIG. 24, there is shown a three phase power line containing phases A, B and C. Each of the phases A, B and C is engaged by disconnect contacts such as disconnect contact 43 and shown as disconnects 43*a*, 43*b* and 43*c* of the movable truck 30. Each of the disconnect contacts is then connected to fuses 62*a*, 62*b* and 62*c* respectively, which are identical to fuse 62, and then to switches 61*a*, 61*b* and 61*c* respectively, which are identical to switch 61. Each phase on truck 30 then carries a potential transformer such as transformer 601, shown as transformer 601*a*, 601*b* and 601*c* in FIG. 24. One terminal of the high voltage windings 603*a*, 603*b* and 603*c* is then connected in series with a respective switch 61*a*, 61*b* and 61*c*, and the other terminals of the high voltage windings are interconnected to phase windings in a wye connection. The secondary windings, 604*a*, 604*b* and 604*c* are also connected in wye, and form three output terminals 605*a*, 605*b* and 605*c* which can be connected to instrumentation and controls.

Note that other circuits could have been selected for the potential transformers. Thus, only two transformers could have been used, connected in open delta, instead of the three in FIG. 24.

It will now be apparent to those skilled in the art that the truck mounting of the potential transformers provides great flexibility to the user of the equipment in that the potential transformer can be isolated from the line by switches 61a, 61b and 61c and then racked out for safe inspection and maintenance. Moreover, the truck mounted equipment can be easily adapted for use as a low current, high voltage rackable fused switch, or as the rackable potential transformer of the invention.

Although there has been described a preferred embodiment of this invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. A truck-mounted potential transformer for metal clad switchgear; said metal clad switchgear comprising a fixed conductive housing for normally receiving truck-mounted switching apparatus and a multiphase truck-mounted apparatus rackable along a straight line between connected and disconnected positions within said housing; said housing having spaced pairs of fixed disconnect contacts secured thereto for each phase of said siwtchgear for receiving cooperating movable disconnect contacts; said multiphase truck-mounted apparatus having only a single operable disconnect contact for each phase of said switchgear; at least two of the phases of said truck-mounted apparatus each including a potential transformer means permanently and fixedly mounted thereon and electrically connected to at least one of said fixed disconnect contacts in said housing; said potential transformer means having output terminals for connection to metering circuits; said potential transformer means being movable with said truck-mounted apparatus and being rackable into and out of engagement with the electrical line associated with said switchgear; a plurality of switches fixed on the truck of said truck-mounted apparatus and connected in series with a respective phase of said truck-mounted apparatus; and interlock means connected to said plurality of switches for preventing the racking of said truck-mounted apparatus when said plurality of switches are closed.

2. The apparatus of claim 1 which further includes a plurality of fuses fixed on said truck and respectively connected in series with each of said plurality of switches.

3. The apparatus of claim 1 which includes a plurality of said potential transformer means for a corresponding plurality phases of said truck-mounted apparatus.

4. The apparatus of claim 3 wherein said plurality of potential transformer means are connected in wye-wye configuration.

5. The apparatus of claim 2 which includes a plurality of said potential transformer means for a corresponding plurality of phases of said truck-mounted apparatus.

* * * * *